United States Patent
Knight et al.

(10) Patent No.: US 8,748,678 B2
(45) Date of Patent: Jun. 10, 2014

(54) FORMULA FOR JOINT SYNTHETIC JET, ROCKET, AND DIESEL FUEL

(76) Inventors: Roy Cameron Knight, Germantown, TN (US); Lori L. Onjukka, Arlington, TX (US); Rolf L. Onjukka, Arlington, TX (US); Yvonne Mae Parrack, Goliad, TX (US)

( * ) Notice: Subject to any disclaimer, the term of this patent is extended or adjusted under 35 U.S.C. 154(b) by 296 days.

(21) Appl. No.: 12/912,238

(22) Filed: Oct. 26, 2010

(65) Prior Publication Data

US 2012/0101317 A1  Apr. 26, 2012

(51) Int. Cl.
*C10L 1/16* (2006.01)
*C10L 1/08* (2006.01)

(52) U.S. Cl.
USPC ............... 585/21; 585/14; 208/15; 44/300

(58) Field of Classification Search
USPC .......... 585/14, 20, 21; 44/300; 208/15, 16, 17
See application file for complete search history.

(56) References Cited

U.S. PATENT DOCUMENTS

| | | | | |
|---|---|---|---|---|
| 4,099,931 A | * | 7/1978 | Bryant et al. | 585/14 |
| 4,332,666 A | * | 6/1982 | Bauman et al. | 208/412 |
| 4,371,727 A | * | 2/1983 | Gavin | 585/14 |
| 4,645,585 A | * | 2/1987 | White | 208/58 |
| 8,058,492 B2 | * | 11/2011 | Anumakonda et al. | 585/14 |
| 8,193,399 B2 | * | 6/2012 | Gosling | 585/14 |
| 8,198,492 B2 | * | 6/2012 | Brady et al. | 585/14 |
| 8,324,438 B2 | * | 12/2012 | Brandvold et al. | 585/240 |
| 8,329,967 B2 | * | 12/2012 | Brandvold et al. | 585/240 |
| 8,329,968 B2 | * | 12/2012 | Brandvold et al. | 585/240 |
| 8,552,232 B2 | * | 10/2013 | Rusek et al. | 585/14 |
| 2009/0000185 A1 | * | 1/2009 | Aulich et al. | 44/308 |
| 2009/0253947 A1 | * | 10/2009 | Brandvold et al. | 585/14 |
| 2010/0076238 A1 | * | 3/2010 | Brandvold et al. | 585/324 |
| 2011/0061290 A1 | * | 3/2011 | Aulich et al. | 44/308 |
| 2013/0253237 A1 | * | 9/2013 | Mathur | 585/14 |

* cited by examiner

*Primary Examiner* — Ellen McAvoy
(74) *Attorney, Agent, or Firm* — Oakwood Law Group, LLP; Yuchien Wei

(57) ABSTRACT

A synthetic fuel formula using a blend of High Density Synthetic (HDS) (e.g. Decalin and Tetralin), and Low Density Synthetic (LDS) (e.g. Synthetic Paraffinic Kerosene—SPK) is disclosed. This HDS and LDS blend has been shown to be useful as a jet, rocket and diesel fuel of standard density, and under low temperature conditions. The inventions described herein relate to 100% synthetic hydrocarbon fuels derived from various carbonaceous materials such as, but not limited to, biomass, municipal waste, natural gas, and coal. This 100% synthetic fuel can be universally used for both jet and diesel fuels. It meets Joint Battlefield Use Fuel of the Future (J-BUFF), or Single Battlefield Fuel (SBF) strategic requirements. The commercial advantage of the present invention is that it can be prepared from commercial available fuel stocks or co-processed using currently available chemical processes.

16 Claims, 1 Drawing Sheet

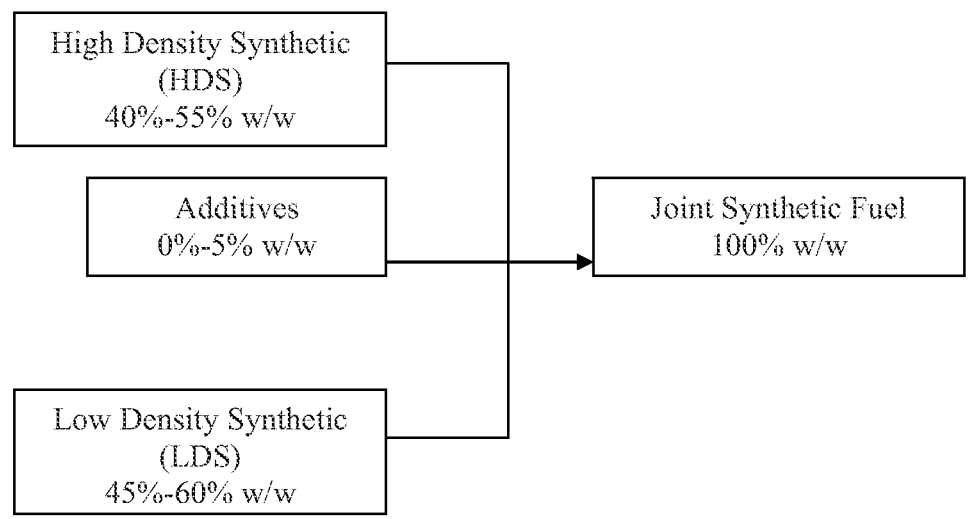

FORMULA FOR JOINT SYNTHETIC JET, ROCKET, AND DIESEL FUEL

BACKGROUND OF THE INVENTION

1. Field of the Invention

The present invention relates to the field of a joint synthetic fuel formula for jet, rocket, or diesel engines, which contains a blend of high density synthetic (HDS) and low density synthetic (LDS) fuels.

2. Description of Related Art

Modern civilization is heavily dependent on crude oil for producing chemical feedstocks and petroleum fuels typically used in combustion engines. Due to the recent increase in demand for fuel from around the world, and the limited production of crude oil, there has been an increase in the price of liquid transportation fuels. In order to increase production of liquid fuel, low cost alternative fuels are needed to meet the ever increasing demand.

There is a vast amount of prior art available regarding non-fossil fuel denoted as carbonaceous feedstocks that can be used for the production of synthetic transportation fuel. Some of the more common carbonaceous feedstocks are coal, biomass, and solid municipal wastes.

The Coal, biomass and carbonaceous waste can be converted to a gaseous or liquid fuel by processes commonly referred to as pyrolysis and also by gasification and subsequent reforming by catalytic molecular synthesis.

Pyrolysis, or more specifically Low Temperature Carbonization (LTC), results in the chemical decomposition of organic materials such as biomass, solid waste or coal. LTC is accomplished by heating in the absence of oxygen. The Karrick process is an example of the pyrolysis of coal, but this process also results in retaining the desired cycloalkane ring structure necessary for HDS. Fuels produced by LTC typically have a density higher than normal for jet and diesel fuel.

In gasification, organic molecules from solid feedstocks are chemically degraded into smaller molecular weight molecules, known as producer gases, synthetic gas or syngas. Syngas is a mixture mainly consisting of carbon monoxide (CO) and hydrogen ($H_2$) that may be used as a fuel formulation feedstock. Syngas can be processed into liquid fuels (such as, gasoline, diesel, jet fuel, etc.) by the Fischer-Tropsch (FT) synthesis process. Fuel produced by this method is known as Synthetic Paraffinic Kerosene (SPK) fuel. Fuels made from this process have a density lower than petroleum jet and diesel fuel. Thus, SPK is classified as LDS fuel for the purpose of the invention described herein.

A significant effort is under way to certify FT synthetic fuels, SPK, for use in U.S. and international aviation fleets. However, because the majorities of SPK are linear alkanes which do not contain highly branched alkanes or aromatic compounds containing high energy content per molecule. SPK lack certain properties suitable for jet and diesel fuels, e.g. seal swelling property for o-ring of engines. The thermal stability of SPK derived fuel is also lower than petroleum derived fuel which may contain aromatic compounds or highly branched alkanes. Consequently, SPK derived fuel is required to be blended with petroleum-derived fuel or other additives for the use of jet and diesel engines.

More specifically, by way of example, U.S. PreGrant Publication No. 2010/0108568 mentioned that straight run FT products have some inherent drawbacks in meeting Jet A-1 and/or Battlefield Use Fuel of the Future (BUFF) specifications, namely a high content of linear alkanes that result in a high freezing point and low temperature viscosity and a low aromatic content. The invention disclosed in U.S. PreGrant Publication No. 2010/0108568 provides a FT jet fuel refining process which includes a step to aromatize one or more of an FT syncrude fraction. The objective is to provide a SPK that meets Jet A-1/JP-8 and/or JP-5/BUFF specifications. The present invention is distinguished from this prior art because the invention utilizes commercially available fuel stocks obtained from the technically and commercially established chemical syntheses/processes.

ASTM International published a new fuel specification for aviation turbine fuels containing synthesized hydrocarbons, D7566, which is made of renewable feedstocks such as algae, jatropha-based, camelina-based SPK. This resulting fuel is virtually identical to jet fuel except it doesn't contain aromatic compound. The aromatic compound add density to the fuel and help maintain proper seal swell. Because of this lack of aromatics in bio-SPK, it is blended with 50% blend of petroleum-derived fuel that provides enough aromatics for adequate o-ring seal swell. The present invention is distinguished from this prior art in that a blend of two synthetic fuels derived from biomass, coal and carbonaceous waste are used instead of petroleum.

U.S. Pat. Nos. 7,683,224 and 7,560,603 disclose a method to make jet and diesel fuel that doesn't need to blend with petroleum-derived fuel to provide aromatics for adequate seal swell. Its method alkylates linear and lightly branched alkanes with aromatic moieties to make monoaromatics for use in jet and diesel fuels. A fuel has such monoaromatics having multiple desired properties such as higher flash point, low pour point, increased density, better lubricity, aerobic degradability, and additionally can deliver benefits in blendstocks. The present invention does not need extra synthesis in order to gain properties meeting jet and diesel fuel specification.

U.S. PreGrant Publication No. 2009/0013591 disclose an alternative gasoline, diesel fuel, marine diesel fuel, jet fuel, and flexible fuel compositions. The compositions include an alcohol and/or a glycerol ether or mixture of glycerol ethers, which can be derived from renewable resources.

In U.S. PreGrant Publication No. 20100011778A, a process of energy production is disclosed. The process includes integrating three or more energy production technologies such that a first byproduct of a first energy production technology is applied to a second energy production technology and a second byproduct of the second energy production technology is applied to a third energy production technology. The related art disclosed a process that integrates three or more energy production technologies in a series arrangement. Nevertheless, the invention disclosed here is a fuel composition that can be prepared by mixing and stirring of two products (HDS fuel and LDS fuel) from Karrick process and FT synthesis although the byproduct (CO or $H_2$) from Karrick process can be applied to FT synthesis. The two products (HDS fuel and LDS fuel) can also be co-produced in parallel. In addition, the prior art does not claim composition of matter.

Although the aforementioned related art provide examples of a fuel or fuel blendstock for jet, rocket, and diesel engines, they involve more complex synthesis or processes in order to produce the desired joint fuels. The present invention is directed at an improved fuel formula that results in a 100% joint synthetic diesel and jet fuel (JSF) using a blend of HDS and LDS fuels, which are commercially available or can be produced by well known processes currently available. JSF overcomes the shortcomings which were discussed above and/or other shortcomings in existing technology.

SUMMARY OF THE INVENTION

Specification for certain jet, rocket and diesel application requires that the fuel utilized have a high density and be easily ignitable and capable of sustaining combustion at temperature of −47 C, and possibly lower. In applications such as jet engines and high altitude rocket engines, specifications also call for fuels having highly reproducible properties. Suitable fuels must also be stable at high temperatures and not deteriorate under a wide variety of shelf-life conditions.

In numerous DoD presentations the concept of Joint Battlespace Use Fuel of the Future (JBUFF) or a Single Battlespace Fuel (SBF) has been presented to use one fuel for all military applications on land, sea and air. A JBUFF fuel will allow for rapid deployment and logistic enhancement for military and emergency aid environments where various types of equipment can be operated with one fuel in place of several types of fuel. The present invention is directed to the formula for producing JSF to meet the chemical system needed for this concept. The present invention also provides a composition of matter for both commercial and military jet and diesel fuels.

In an exemplary embodiment of the present invention, there is disclosed an improved fuel formula that results in a 100% JSF for jet, rocket and diesel engines using biomass, municipal waste, natural gas or coal feedstocks. The fuel formula comprises HDS fuel, LDS fuel and/or minor additives. The HDS fuel is essentially Decalin and Tetralin. The LDS fuel is SPK. The preferred fuel formulation of this invention is a mixture of at least 40% by weight decalin/tetralin and remainder synthetic paraffin.

As such, those skilled in the art will understand that the conception, upon which this invention is based, may readily be utilized as a basis for the designing of other formula for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

The accompanying drawing, which are incorporated in and constitute a part of this specification, illustrate the embodiment of the invention and together with the description, serve to explain the principles of the invention.

FIG. 1 is a schematic of the formulation of JSF through blending or co-processing according to one embodiment of the invention.

DESCRIPTION OF THE PREFERRED EMBODIMENT

Referring to FIG. 1, there is disclosed a schematic of the formulation of JSF through blending or co-producing according to one of embodiment of the invention.

The HDS can be obtained through pyrolysis. The Karrick process is an example of the pyrolysis of coal which leads to retaining of the desired cycloalkane ring and/or hydroaromatic ring structure, which are necessary for certain physical properties, e.g. high density, higher stability in comparison with SPK and good seal swelling property. Particularly, the cycloalkane and hydroaromatic compounds have higher thermal stability relative to the stability of n-alkanes that are major components of the SPK, and thus can attribute to the thermal stability of the jet and diesel fuels. The seal swelling properties is also critical to the gasket o-ring sealing to prevent the jet fuel tank from leaking. The HDS fuel of this invention is essentially Decal in (decahydronapthalene) and Tetral in (tetrahydronapthalene) of which the density is higher than normal for jet and diesel fuel.

The LDS can be derived by gasification and/or reformation coupled with FT synthesis. The LDS fuel produced by this method is known as SPK and has a density lower than petroleum jet and diesel fuel. The shortcomings of SPK, for example, low density, low thermal stability, and poor seal swelling property can be overcome by HDS fuel mentioned above.

Decalin and Tetralin (both naphthalene derivatives) are completely miscible with paraffin. These two naphthalene derivates are also completely miscible with each other. Therefore, the fuel formulations of this invention may be prepared by mixing and stirring the commercially available ingredients. When the HDS fuel (essentially Decalin and Tetralin) and LDS fuel (SPK) are synergistically blended or co-processed, the resulting formula of the invention has the density consistent with conventional petroleum jet and diesel fuel. This formula meets specification for jet, rocket, and diesel fuels in that the formula exhibits highly reproducible properties, has correct density, and has freeze points and flash points which permit ignition and sustained combustion at −47 C. A mixture of at least 40% by weight Decalin/Tetralin and remainder synthetic paraffin freezes at below −57 C. This is the preferred fuel formulation of this invention.

The further addition of minor additives assures conformity of other fuel properties such as lubricity and conductivity. The density of fuel produced with this formula is consistent with conventional petroleum jet and diesel fuel. This results in the embodiment described herein to be classified as a "drop-in" alternative to either jet or diesel fuel. The superior thermal stability and long shelf life properties of JSF makes it an ideal rocket fuel.

The embodiment disclosed in FIG. 1 comprises (a) a HDS fuel from about 40% to about 55% by weight of the fuel formula; (b) a LDS fuel from about 45% to about 60% by weight of the fuel formula; and (c) additives from about 0% to about 5% by weight of the fuel formula.

It will be apparent to those skilled in the art that various modifications and variations can be made to the disclosed formula for joint synthetic jet and diesel fuel without departing from the scope of the invention. Other embodiments of the invention will be apparent to those skilled in the art from consideration of the specification and practice of the invention disclosed herein. It is intended that the specification and examples be considered as exemplary only, with a true scope being indicated by the following claims and their equivalents.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings.

The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A joint synthetic fuel comprising:
   at least 40% by weight high density synthetic fuel (HDS) which is a mixture of cycloalkane and hydroaromatic compounds;
   at least 45% by weight low density synthetic fuel (LDS) which comprises n-alkane abundant synthetic paraffinic kerosene (SPK); and
   additives.

2. The joint synthetic fuel of claim 1, wherein said HDS is preferably a mixture of decahydronaphthalene (Decalin) and tetrahydronaphthalene (Tetralin).

3. The joint synthetic fuel of claim 1, wherein said HDS is from about 40% to about 50% by weight, said LDS is from about 45% to about 60% by weight, and said additives is from about 0% to about 5% by weight.

4. The joint synthetic fuel of claim 1, wherein said joint synthetic fuel makes o-rings swell without the need to add unsaturated aromatics.

5. The joint synthetic fuel of claim 1, wherein said joint synthetic fuel has a density similar to a density of a conventional jet and diesel fuel.

6. The joint synthetic fuel of claim 1, wherein said joint synthetic fuel has a freezing point at below −57 degrees Celsius.

7. The joint synthetic fuel of claim 1, wherein said joint synthetic fuel has heat of combustion and hydrogen content meeting jet fuel requirements.

8. The joint synthetic fuel of claim 1, wherein said joint synthetic fuel has a cetane index and number meeting diesel specification requirements without the need to use additive cetane enhancers.

9. The joint synthetic fuel of claim 1, wherein said joint synthetic fuel does not rely on sulfur compounds to give conductivity and lubricity that meet jet and diesel fuel specifications.

10. The joint synthetic fuel of claim 1, wherein said joint synthetic fuel is compatible with jet and diesel engine fuel systems and said joint fuel is interchangeable with petroleum fuel.

11. The joint synthetic fuel of claim 1, wherein said joint synthetic fuel is cleaner burning and lower in sulfur than conventional petroleum jet or diesel fuel.

12. The joint synthetic fuel of claim 1, wherein said joint synthetic fuel meets known military and commercial jet and diesel fuel specifications.

13. The joint synthetic fuel of claim 1, wherein said HDS which is derived from Low Temperature Carbonization (LTC) and said LDS which is obtained by gasification coupled with Fischer-Tropsch synthesis are synergistically blended.

14. The joint synthetic fuel of claim 1, wherein said HDS which is derived from Low Temperature Carbonization (LTC) and said LDS which is obtained by gasification coupled with Fischer-Tropsch synthesis are synergistically co-produced.

15. A method of producing joint synthetic fuel, the method comprising:
   mixing from 40 to 50 weight percent high density synthetic fuel which comprises essentially decahydronaphthalene (Decalin) and tetrahydronaphthalene (Tetralin) with from 45 to 60 weight percent low density synthetic fuel which comprises essential n-alkane abundant synthetic paraffinic kerosene, and with from 0 to 5 weight percent additives.

16. A joint synthetic fuel for jet, rocket and diesel comprising:
   high density synthetic fuel which comprises essentially decahydronaphthalene (Decalin) and tetrahydronaphthalene (Tetralin), from 40 to 50 weight percent;
   low density synthetic fuel which comprises essentially synthetic paraffinic kerosene, from 45 to 60 weight percent; and
   additives, from 0 to 5 weight percent.

* * * * *